(12) United States Patent
Fornage et al.

(10) Patent No.: US 8,937,817 B2
(45) Date of Patent: Jan. 20, 2015

(54) LOSSLESS COMMUTATION DURING OPERATION OF A POWER CONVERTER

(75) Inventors: Martin Fornage, Petaluma, CA (US); Donald Richard Zimmanck, Petaluma, CA (US)

(73) Assignee: Enphase Energy, Inc., Petaluma, CA (US)

( * ) Notice: Subject to any disclaimer, the term of this patent is extended or adjusted under 35 U.S.C. 154(b) by 839 days.

(21) Appl. No.: 13/104,829

(22) Filed: May 10, 2011

(65) Prior Publication Data

US 2012/0020122 A1    Jan. 26, 2012

Related U.S. Application Data

(60) Provisional application No. 61/395,310, filed on May 10, 2010.

(51) Int. Cl.
  *H02M 3/335*  (2006.01)
(52) U.S. Cl.
  USPC .......................................... 363/16; 363/21.01
(58) Field of Classification Search
  USPC ................................................ 363/17–28, 16
  See application file for complete search history.

(56) References Cited

U.S. PATENT DOCUMENTS

| | | | |
|---|---|---|---|
| 4,495,554 A * | 1/1985 | Simi et al. ................... | 363/21.15 |
| 4,857,822 A | 8/1989 | Tabisz et al. | |
| 4,931,716 A | 6/1990 | Jovanovic et al. | |
| 5,801,460 A * | 9/1998 | Diemer et al. ................ | 307/129 |
| 6,330,170 B1 | 12/2001 | Wang et al. | |
| 2011/0128758 A1* | 6/2011 | Ueno et al. ...................... | 363/17 |

OTHER PUBLICATIONS

International Search Report and Written Opinion mailed Jan. 2, 2012 for PCT Application No. PCT/US2011/035968.
W.A. Tabisz and F.C. Lee, "Zero-Voltage-Switching Multi-Resonant Technique—A Novel Approach to Improve Performance of High-Frequency Quasi-Resonant Converters", Virginia Power Electronics Center, Department of Electrical Engineering, Virginia Polytechnic Institute and State University, Blacksburg, VA, IEEE PESC, Apr. 1988, pp. 9-17.
F.C. Lee "High-Frequency Quasi-Resonant and Multi-Resonant Converter Technologies", Virginia Power Electronics Center, Virginia Polytechnic Institute and State University, Blacksburg, VA, IEEE IECON, 1988, pp. 509-521.

* cited by examiner

*Primary Examiner* — Jessica Han
(74) *Attorney, Agent, or Firm* — Moser Taboada

(57) ABSTRACT

A method for operating a DC-DC converter. The method comprises: matching, based on a turns ratio of a transformer of the DC-DC converter, a primary side capacitance of the DC-DC converter and a secondary side capacitance of the DC-DC converter to result in a matched capacitance; and operating the DC-DC converter with at least one operating parameter set to cause a primary current to oscillate between a peak value and zero such that a valley of the primary current coincides with a zero crossing of a secondary switching element voltage.

20 Claims, 9 Drawing Sheets

US 8,937,817 B2

LOSSLESS COMMUTATION DURING OPERATION OF A POWER CONVERTER

CROSS-REFERENCE TO RELATED APPLICATIONS

This application claims benefit of U.S. provisional patent application Ser. No. 61/395,310, filed May 10, 2010, which is herein incorporated in its entirety by reference.

BACKGROUND OF THE INVENTION

1. Field of the Invention

Embodiments of the present disclosure relate generally to DC-DC power conversion, and, in particular, to lossless commutation during DC-DC power conversion.

2. Description of the Related Art

Electronic switch-mode DC-DC converters convert one DC voltage level to another by transferring energy through a storage medium. Some switch-mode DC-DC converters, such as flyback converters, utilize transformers to perform such energy storage. In a flyback converter, energy is stored in a primary winding of the transformer during a first period when a current control switch is activated to allow current flow through the primary winding, and the stored energy is then transferred to a secondary winding of the transformer during a second period when the current control switch is deactivated.

During operation of the flyback converter, current flowing in the primary winding produces a magnetic flux that is coupled to the secondary winding. The magnetic flux also traverses paths in between the windings, resulting in leakage inductance in the transformer. Such leakage inductance is a property of the transformer where the windings of the transformer appear to have some self inductance in series with each winding. The energy stored in the leakage inductance cannot be transferred to the secondary winding and is therefore wasted. Additionally, when the current control switch is deactivated, the leakage inductance causes the voltage across the current control switch to ring, resulting in a sharp voltage peak across the switch and potentially damaging the switch. To mitigate this risk, high cost switches must be employed.

Therefore, there is a need in the art for a method and apparatus for more efficiently operating a DC-DC converter.

SUMMARY OF THE INVENTION

Embodiments of the present invention generally relate to a method for operating a DC-DC converter. The method comprises: matching, based on a turns ratio of a transformer of the DC-DC converter, a primary side capacitance of the DC-DC converter and a secondary side capacitance of the DC-DC converter to result in a matched capacitance; and operating the DC-DC converter with at least one operating parameter set to cause a primary current to oscillate between a peak value and zero such that a valley of the primary current coincides with a zero crossing of a secondary switching element voltage.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
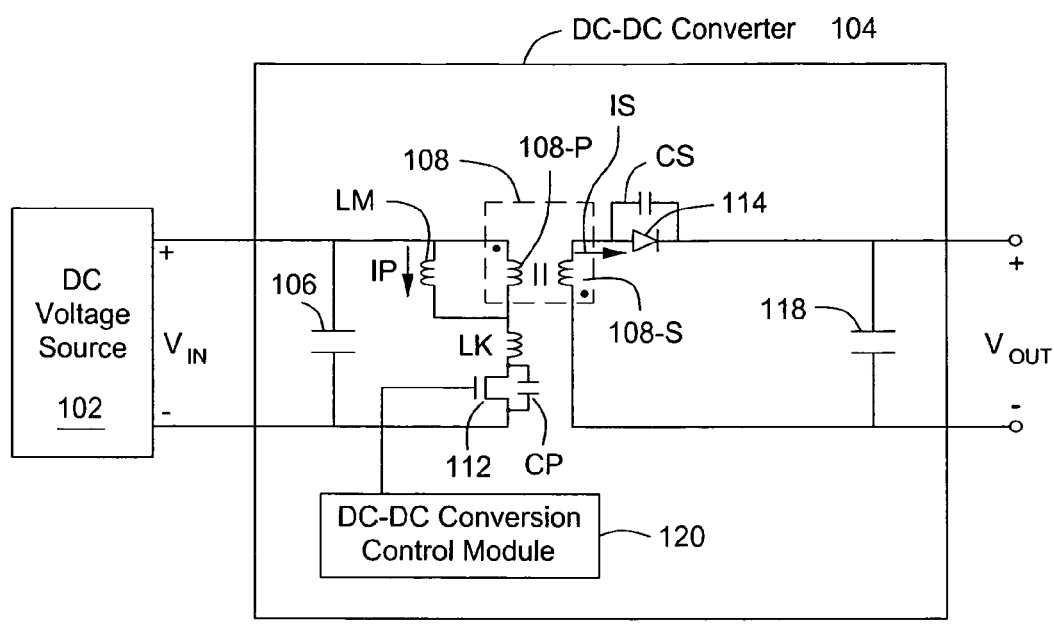
FIG. 1 is a block diagram of a power conversion system adapted for lossless commutation in accordance with one or more embodiments of the present invention.

FIG. 1 is a block diagram of a power conversion system 100 adapted for lossless commutation in accordance with one or more embodiments of the present invention. The power conversion system 100 comprises a DC voltage source 102 and a DC-DC converter 104. The DC voltage source 102 may be any suitable DC source, such as an output from a previous conversion stage, a battery, a renewable energy source (e.g., a solar panel, a wind turbine, a hydroelectric system, or similar renewable energy source), or the like, for providing a DC voltage. The DC-DC converter 104 may be employed in a stand-alone configuration for DC-DC power conversion as depicted in FIG. 1. Alternatively, the DC-DC converter 104 may be utilized with or as a component of other power conversion devices, such as a DC-AC inverter. For example, the DC-DC converter 104 may be a power conversion stage within a DC-AC inverter that converts DC power from one or more renewable energy sources, such as a photovoltaic (PV) panel, to AC power.

In one embodiment, the DC-DC converter 104 is a flyback converter (i.e., a switched mode converter) comprising a transformer, which can be modeled as an ideal transformer 108 and external inductances which model the non-ideal aspects of the transformer, such as the magnetizing inductance and leakage inductance. A primary side of the DC-DC converter 104 comprises an input capacitor 106, a primary winding 108p of the transformer 108, an inductor LM coupled across the primary winding 108p and representing the transformer magnetizing inductance, and a current control switch 112. A leakage inductance of the transformer 108 is represented as an inductor LK in series with the primary winding 108p; alternatively, the inductor LK may be coupled to the DC-DC converter 104 in a manner that is electronically equivalent to being coupled in series with the primary winding 108p (e.g., the inductor LK may be coupled in series with the secondary winding 108s to represent the leakage inductance). A capacitor CP (representing an effective primary side capacitance) is coupled in parallel with the current control switch 112; alternatively, the capacitor CP may be coupled to the DC-DC converter 104 in a manner that is electronically equivalent to being coupled across the current control switch 112 (e.g., the capacitor CP may be coupled across the primary winding 108p ). In some embodiments, the capacitor CP may represent a parasitic capacitance of the current control switch 112. The input capacitor 106 is coupled across two input terminals of the DC-DC converter 104 for receiving an input voltage Vin from the DC voltage source 102, and is further coupled across a series combination of the primary winding 108p, the inductor LK, and the current control switch 112.

In some alternative embodiments, the inductor LK may represent a combination of the transformer leakage inductance and one or more additional inductances in series with the primary winding 108p and/or the secondary winding 108s; i.e., LK represents a total effective series inductance referenced to the primary side and may embody inductances intentionally and/or unintentionally placed on the primary and/or secondary side. For example, LK may represent the parasitic leakage inductance of the transformer 108 plus the parasitic inductance(s) of one or more other components and/or the inductance(s) of one or more inductors coupled to the DC-DC converter 104. Additionally or alternatively, CP may represent a combination of the parasitic capacitance of the control switch 112 and one or more additional capacitances, such as the parasitic capacitance(s) of one or more other components and/or the capacitance(s) of one or more capacitors across the control switch 112 or coupled to the DC-DC converter 104 in a manner that is electronically equivalent to being coupled across the control switch 112. In some such alternative embodiments, one or more of the additional inductors and/or capacitors may be tunable and/or capable of being operably switched into or out of the DC-DC converter 104 (e.g., an inductor may be switched into or out of the circuit by a switch in parallel with the inductor; a capacitor may be switched into or out of the circuit by a switch in series with the capacitor).

A secondary side of the DC-DC converter 104 comprises the secondary winding 108s of the transformer 108, a diode 114, and an output capacitor 118. The secondary winding 108s is coupled across a series combination of the diode 114 (i.e., a secondary switching element) and the output capacitor 118, with an anode terminal of the diode 114 coupled to a first terminal of the secondary winding 108s, a cathode terminal of the diode 114 coupled to a first terminal of the output capacitor 118, and a second terminal of the output capacitor 118 coupled to a second terminal of the secondary winding 108s. In some alternative embodiments, different configurations may be employed for secondary rectification. For example, a second diode may be coupled between the second terminal of the secondary winding 108s and the second terminal of the capacitor 118; the diode 114 may be coupled between the second terminal of the secondary winding 108s and the second terminal of the output capacitor 118; or the secondary rectification may be performed by a switch controlled by a suitable controller rather than a diode (e.g., "synchronous rectification").

Two output terminals of the DC-DC converter 104 are coupled across the output capacitor 118 for providing an output voltage, Vout. A capacitor CS (representing an effective secondary side capacitance) is coupled in parallel with the diode 114; alternatively, the capacitor CS may be coupled to the DC-DC converter 104 in a manner that is electronically equivalent to being coupled across the diode 114. Analogous to the capacitor CP, in some embodiments the capacitor CS may represent a parasitic capacitance of the diode 114; in some alternative embodiments the capacitor CS may represent a combination of the parasitic capacitance of the diode 114 as well as the parasitic capacitance(s) of one or more other components and/or one or more additional capacitors coupled across the diode 114 or coupled to the DC-DC converter 104 in a manner that is electronically equivalent to being coupled across the diode 114. In some such alternative embodiments, one or more of the additional capacitors may be tunable and/or capable of being operably switched into or out of the DC-DC converter 104 (e.g., a particular capacitor may be switched into or out of the circuit by a switch in series with the capacitor).

The DC-DC converter 104 further comprises a DC-DC conversion control module 120 coupled to a terminal of the current control switch 112 for controlling (i.e., activating and deactivating) the current control switch 112.

The DC-DC converter 104 receives the input voltage Vin from the DC voltage source 102 and converts the input voltage Vin to the output voltage Vout based on the activation and deactivation of the current control switch 112. When the current control switch 112 is activated (i.e., closed), a linearly rising primary current Ip flows through the inductor LM, storing energy within the inductor LM as well as the inductor LK. At a peak level of the primary current Ip (i.e., at Ippeak), the current control switch 112 is deactivated (i.e., opened), causing the energy stored in the inductor LM to be transferred to the secondary winding 108s and generating a linearly decaying secondary current Is through the diode 114. The resulting charging/discharging of the output capacitor 118 through the switching cycles of the current control switch 112 generates the desired output voltage Vout.

At the time the current control switch 112 is opened, there is energy stored in the inductor LK. However, because there is no coupling between the inductor LK and the secondary winding 108s, such energy cannot be transferred to the secondary winding 108s. In accordance with one or more embodiments of the present invention and as described below, the peak current Ippeak, the capacitors CP and CS, and the inductor LK are established such that the energy stored in the inductor LK is transferred to the capacitors CP and CS. The transferred energy may then be recovered during soft switching of the DC-DC converter 104, thereby eliminating ringing on the drain-source voltage of the current control switch 112 during energy transfer between the primary winding 108p and the secondary winding 108s, and resulting in lossless commutation of energy in the transformer 108.

In one or more alternative embodiments, lossless commutation may be achieved utilizing one or more additional elements within the DC-DC converter 104, such as one or more capacitors (e.g., coupled across the capacitor CP, the capacitor CS, and/or coupled to the DC-DC converter 104 in a manner that is electronically equivalent to being coupled across CP and/or CS) and/or one or more inductors (e.g., coupled in series with the inductor LK or coupled to the DC-DC converter 104 in a manner that is electronically equivalent to being coupled in series with LK). In some embodiments, one or more of these additional elements may be tunable and/or capable of being operably switched into or out of the DC-DC converter 104.

In one or more alternative embodiments, the DC-DC converter 104 may be a boost converter, a buck-boost converter, a forward converter, a full bridge converter, or similar converter having similar commutations.

Figure 2:
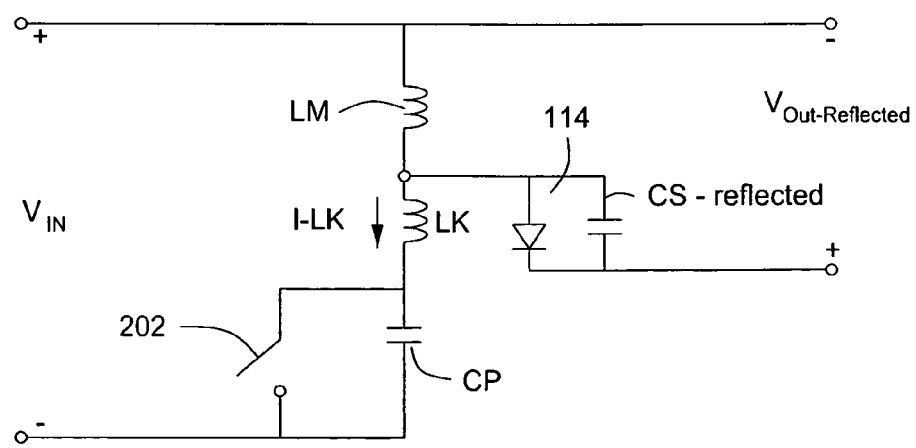
FIG. 2 is a schematic diagram of an equivalent circuit when a current control switch is deactivated in accordance with one or more embodiments of the present invention.

FIG. 2 is a schematic diagram of an equivalent circuit 200 when a current control switch 112 is deactivated in accordance with one or more embodiments of the present invention. The equivalent circuit 200 utilizes the ideal transformer model depicted in FIG. 1 with the real transformer modeled as the ideal transformer 108 and inductors LM and LK modeling the magnetizing inductance and leakage inductance, respectively. The circuit 200 comprises a series coupling of the inductor LM, the inductor LK, and the capacitor CP, where the inductance of the inductor LM is much greater than the inductance of inductor LK. The voltage Vin is across the series coupling of LM, LK, and CP. An ideal switch 202, representing the current control switch 112, is coupled across the capacitor CP. Capacitor CS-reflected represents the capacitor CS reflected on the primary side of the transformer 108. The capacitor CS-reflected and the diode 114 are coupled in parallel; an anode terminal of the diode 114 is coupled between the inductors LM and LK at a first terminal of LM. A voltage Vout-reflected is across a second terminal of LM and a cathode terminal of the diode 114.

In accordance with one or more embodiments of the present invention, the primary and secondary side capacitances (Ccp and Ccs, respectively), the inductance of LK (Llk), the peak current (Ippeak), and the converter input and output voltages (Vin and Vout, respectively), are interdependent for achieving lossless commutation when the switch 202 is opened, as described below.

In order to achieve the lossless commutation, a first condition requires that the capacitances of capacitors CP and CS-reflected must be equivalent; i.e., the capacitances of capacitors CP and CS must be matched based on a turns ratio of the transformer 108:

$$Ccp = \left(\frac{Ns}{Np}\right)^2 * Ccs = Cmatch \quad (1)$$

where Ccp=capacitance of the capacitor CP, Ccs=capacitance of the capacitor CS, Np=number of turns of the primary winding 108p, Ns=number of turns of the secondary winding 108s, and Cmatch=the matched primary and secondary side capacitance. In some embodiments, the capacitances Ccp and Ccs may not be linear; for example, parasitic capacitance of a metal-oxide-semiconductor field-effect transistor (MOSFET) or a diode may vary considerably over voltage. In such embodiments, the equations presented here may vary; however, the non-linear capacitances have an effective capacitance at a specific operating point and the method of the present invention holds. For example, values to achieve the results of the present invention may be determined by utilizing numerical analysis, simulation, or similar techniques.

In some alternative embodiments, the capacitors CP and/or CS represent a combination of parasitic capacitance as well as one or more capacitors coupled across the current control switch 112 (or coupled to the DC-DC converter 104 in a manner that is electronically equivalent to being coupled across the current control switch 112) and the diode 114 (or coupled to the DC-DC converter 104 in a manner that is electronically equivalent to being coupled across the diode 114), respectively. In such embodiments, the total capacitance of CP (i.e., the capacitance of all capacitors represented by CP) and the total capacitance of CS (i.e., the capacitance of all capacitors represented by CS) are matched with respect to the transformer turns ratio. In some such embodiments, the additional capacitors may be tuned and/or operably switched into and out of the circuit to achieve matched primary and secondary side capacitances at any particular time.

When the primary current Ip reaches the peak value Ippeak during operation of the DC-DC converter 104, the switch 202 (i.e., the ideal switch 202 representing the current control switch 112) is deactivated and energy stored in the inductor LK results a continued flow of the primary current Ip, which is referred to as a sinusoidal leakage inductance current Ilk (i.e., the primary current Ip following the opening of the switch 202). The voltages Vcp and Vcsr across the capacitors CP and CS-reflected, respectively, begin to rise. In order to achieve the lossless commutation, a valley of the leakage inductance current Ilk (i.e., when Ilk is at zero and has zero slope dIlk/dt=0) must coincide with the zero-crossing of Vcsr (i.e., the zero-crossing of Vcs); additionally at this point, the voltage Vcp crosses the value of Vin+(Np/Ns)*Vout. From such point forward, the leakage inductance current Ilk is zero, the voltage Vcp is at a steady state value of Vin+(Np/Ns)*Vout, and Vcsr (as well as Vcs) is at a steady state value of zero.

Following the switch opening, the leakage inductance current Ilk (which also may be referred to as the primary current Ip) oscillates between the peak value Ippeak and zero such that a valley of the leakage inductance current Ilk may coincide with the zero-crossing of Vcsr (as well as the Vin+(Np/Ns)*Vout crossing of Vcp) at one of regularly spaced transition times TTR based on the resonant period $$2\pi\sqrt{\frac{1}{2}Llk * Cmatch} : \quad (2)$$

$$TTR = n * \pi\sqrt{\frac{1}{2}Llk * Cmatch}$$

where n=any odd integer (1, 3, 5, and the like), Llk is the inductance of the inductor LK (i.e., the total effective series inductance referenced to the primary side), and Cmatch is the matched primary and secondary side effective capacitance. As previously described, LK represents a total effective series inductance referenced to the primary side, which may embody one or more inductances intentionally or unintentionally placed on the primary and/or secondary side.

Lossless commutation may then be achieved by suitably setting one or more parameters of the DC-DC converter 104 such that Ilk=0 and has zero slope, and Vcsr=0 at one of the transition points. At such point, the voltage Vcp=Vin+(Np/Ns)*Vout.

In some embodiments, lossless commutation may be achieved by operating the DC-DC converter 104 at a peak current Ippeak that is based on the transition times TTR and results in a leakage inductance current Ilk valley coincident with the zero-crossing of Vcsr as well as the Vin+(Np/Ns)*Vout crossing of Vcp:

$$Ippeak = \frac{2 * Cmatch * \left(Vin + \frac{Np}{Ns}Vout\right)}{n\pi\sqrt{\frac{1}{2}Llk * Cmatch}} \quad (3)$$

where n=any odd integer (1, 3, 5, and the like), Cmatch is the matched primary and secondary side effective capacitance, Llk is the total effective series inductance referenced to the primary side, Np=number of turns of the primary winding 108p, Ns=number of turns of the secondary winding 108s, Vin is the converter input voltage, and Vout is the converter output voltage.

In such embodiments where the DC-DC converter peak current is determined based on equation (3), one or more of Cmatch, Llk, Vin, and Vout may be fixed or may dynamically change during operation of the DC-DC converter 104 and a new value of Ippeak is determined accordingly. For example, Cmatch and Llk may be fixed values while Vin and Vout are varied, and the peak current Ippeak changes accordingly as Vin and Vout vary. In some embodiments, a desired output voltage Vout may be achieved for a given input voltage Vin by operating the DC-DC converter 104 at different peak currents Ippeak that each result in lossless commutation. For example, the DC-DC converter 104 may be operated for one or more switching cycles utilizing a first peak current Ippeak(1) for lossless commutation, followed by one or more switching cycles utilizing a second peak current Ippeak(2) for lossless commutation, where such dithering between the first and second peak currents results in an average peak current to generate the desired output voltage Vout for the given Vin while achieving lossless commutation.

In other embodiments, lossless commutation may be achieved by setting the primary and secondary side effective capacitances (i.e., Ccp and Ccs) based on a value of Cmatch computed such that a leakage inductance current Ilk valley coincides with the zero-crossing of Vcsr and the Vin+(Np/Ns)*Vout crossing of Vcp:

$$Cmatch = \left(\frac{\frac{1}{2}Ippeak * n * \pi\sqrt{\frac{1}{2}Llk}}{Vin + \frac{Np}{Ns}Vout}\right)^2 \quad (4)$$

where n=any odd integer (1, 3, 5, and the like), Ippeak is the peak current, Llk is the inductance of the inductor LK (i.e., the total effective series inductance referenced to the primary side), Np=number of turns of the primary winding 108p, Ns=number of turns of the secondary winding 108s, Vin is the converter input voltage, and Vout is the converter output voltage.

In such embodiments where Ccp and Ccp are set based on a value of Cmatch computed as in equation (4), one or more of Llk, Ippeak, Vin, and Vout may be fixed or may dynamically change during the operation of the DC-DC converter 104 and Ccp/Ccs are set accordingly. For example, each of the aforementioned parameters may have fixed values and the current control switch 112 and the diode 114 are selected to have parasitic capacitances as specified by equations (1) and (4). As another example, one or more of these parameters may change during operation of the DC-DC converter 104; as the parameter(s) change, a new Cmatch value is computed and new values of Ccp and/or Ccs are implemented accordingly, for example by tuning or operably switching components into/out of the DC-DC converter 104.

In some embodiments, CP and/or CS may represent (in addition to parasitic capacitances) one or more capacitors that may be tuned or switched into/out of the DC-DC converter 104 such that the total capacitance Ccp (i.e., the total capacitance of all capacitors represented by CP) and the total capacitance of Ccs (i.e., the total capacitance of all capacitors represented by CS) satisfy equations (1) and (4). For example, the peak current Ippeak may change during switching cycles of the DC-DC converter 104 and, based on Ippeak changes from one switching cycle to another, one or more capacitors represented by CP and/or CS may be adjusted (e.g., tuned or operably switched into/out of the circuit) to achieve capacitances Ccp and Ccs that satisfy equations (1) and (4) for lossless commutation.

In still other embodiments, lossless commutation may be achieved by setting the inductance Llk to a value determined such that a leakage inductance current Ilk valley coincides with the zero-crossing of Vcsr and the Vin+(Np/Ns)*Vout crossing of Vcp:

$$Llk = \left(\frac{2\sqrt{2 * Cmatch} * \left(Vin + \frac{Np}{Ns}Vout\right)}{n\pi * Ippeak}\right)^2 \quad (5)$$

where n=an odd integer (1, 3, 5, and the like), Cmatch is the matched primary and secondary side effective capacitance, Ippeak is the peak current, Np=number of turns of the primary winding 108p, Ns =number of turns of the secondary winding 108s, Vin is the converter input voltage, and Vout is the converter output voltage.

In such embodiments where lossless commutation is achieved by setting Llk as specified in equation (5), one or more of Cmatch, Ippeak, Vin, and Vout may be fixed or may dynamically change during the operation of the DC-DC converter 104 and Llk is set accordingly. For example, each of the aforementioned parameters may have fixed values and the transformer 108 is then selected to have a leakage inductance as specified by equation (5). As another example, one or more of the parameters may change during operation of the DC-DC converter 104; as the parameter(s) change, a new Llk value is computed and set accordingly, for example by tuning or switching components into/out of the DC-DC converter 104, In some embodiments, LK may represent the leakage inductance of the transformer 108 as well as one or more inductors (e.g., in series with the primary winding 108p and/or the secondary winding 108s) that may be tuned or operably switched into/out of the DC-DC converter 104 to achieve an inductance as specified by equation (5). For example, the peak current Ippeak may change during switching cycles of the DC-DC converter 104 and, based on such changes, one or more inductors represented by LK may be adjusted (e.g., tuned or operably switched into/out of the circuit) to achieve a total inductance that meets equation (5) for lossless commutation.

In general, lossless commutation may be achieved during operation of the DC-DC converter 104 for any combination of the parameters Ccp, Ccs, Llk, Ippeak, Vin, or Vout that meet the equations above.

Figure 3:
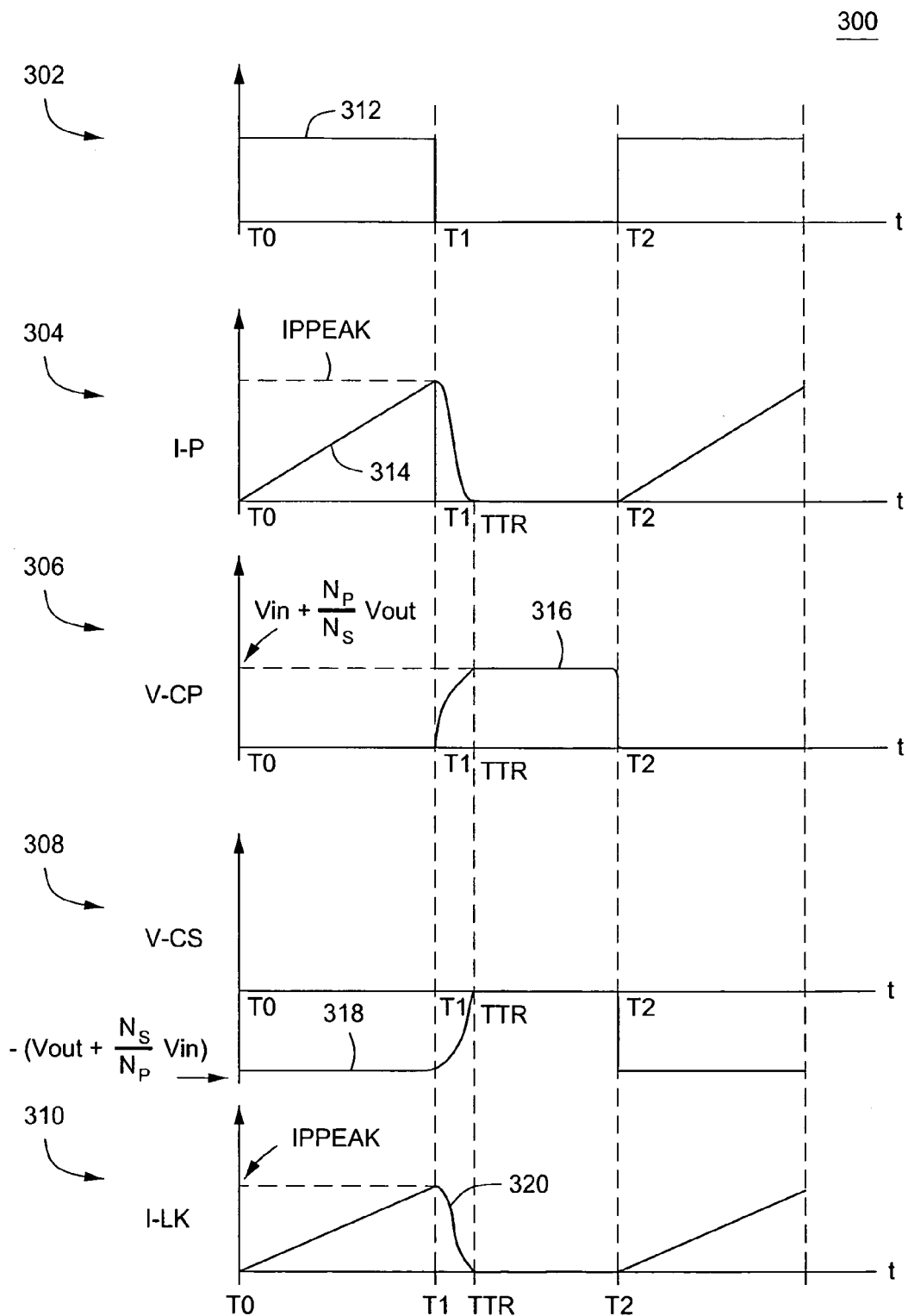
FIG. 3 is a plurality of graphical diagrams depicting current and voltage waveforms of the DC-DC converter when lossless commutation is achieved based on a first transition time in accordance with one or more embodiments of the present invention.

FIG. 3 is a plurality of graphical diagrams 300 depicting current and voltage waveforms of the DC-DC converter 104 when lossless commutation is achieved based on a first transition time in accordance with one or more embodiments of the present invention. The first transition time TTR1 is determined based on equation (2) with a value of n=1. The DC-DC converter 104 may be operated to achieve the lossless commutation based on any of the equations (3), (4), or (5) as previously described, where n=1.

The graphical diagrams 300 comprise diagram 302 of a waveform 312 depicting a switch control voltage over time ("switch control waveform 312"), diagram 304 of a waveform 314 depicting the primary current over time ("Ip waveform 314"), diagram 306 of a waveform 316 depicting voltage across the capacitor CP over time ("Vcp waveform 316"), diagram 308 of a waveform 318 depicting voltage across the capacitor CS over time ("Vcs waveform 318"), and diagram 310 of a waveform 320 depicting leakage inductance current Ilk over time ("Ilk waveform 320"). The leakage inductance current Ilk is equivalent to the primary current Ip but is depicted separately to emphasize that, following the opening of the switch 112, the current flow through the primary winding 108p results from energy stored in the inductor LK.

In some alternative embodiments, the Vcs waveform 318 depicts voltage across an alternative secondary switching element (e.g., a switch controlled by a suitable controller for performing the secondary rectification).

The switch control waveform 312 is generated by the DC-DC conversion control module 120 for activating and deactivating the current control switch 112. When the switch control waveform 312 is high, the current control switch 112 is activated (i.e., on); when the switch control waveform 312 is low, the current control switch 112 is deactivated (i.e., off). From time T0 to time T1, the switch control waveform 312 is high and maintains the current control switch 112 in an active state. The Ip waveform 314 and the Ilk waveform 320 (identical to the Ip waveform 314) linearly rise toward a peak value of Ippeak. The Vcp waveform 316 is essentially zero due to the active current control switch 112, and the diode 114 is reversed biased with the Vcs waveform 318 at $-(Vout+(Ns/Np)*Vin)$.

At time T1, the switch control waveform 312 drops to low and deactivates the current control switch 112. The Ip waveform 314 begins to decline from the peak value Ippeak to zero in the form of a cosine wave with a DC offset of ½*Ippeak as the flow of current through the primary winding 108p declines. Due to the presence of the leakage inductance (i.e., the inductance represented by inductor LK), the Vcp waveform 316 begins to rapidly rise in the form of a sine wave summed with a linear ramp function. Identical to the Ip waveform 314, the Ilk waveform 320 sinusoidally declines as it begins to ring. As the energy stored in the primary winding 108p is transferred to the secondary winding 108s, the Vcs waveform 318 rises in the form of a cosine function summed with a linear ramp function.

A transition time TTR occurs after the switch opening at time $$T1 + \pi\sqrt{\frac{1}{2}Llk*Cmatch}.$$

At the transition time TTR, the switch control waveform 312 remains low and the Ip waveform 314 is at zero with zero slope. Additionally, the Vcp waveform 316 reaches a steady state value of $Vin+(Np/Ns)*Vout$ (dVcp/dt=0 at TTR), the Vcs waveform 318 reaches a steady state value of zero, and the Ilk waveform 320 (identical to the Ip waveform 314) reaches a steady state value of zero (dIlk/dt=0 at TTR).

At time T2, the switch control waveform 312 returns to a high level to activate the current control switch 112. The Ip waveform 314 and the Ilk waveform 320 identically begin to linearly rise. The Vcp waveform 316 is essentially zero due to the active current control switch 112, and the diode 114 is reversed biased with the Vcs waveform 318 at $-(Vout+(Ns/Np)*Vin)$.

Figure 4:
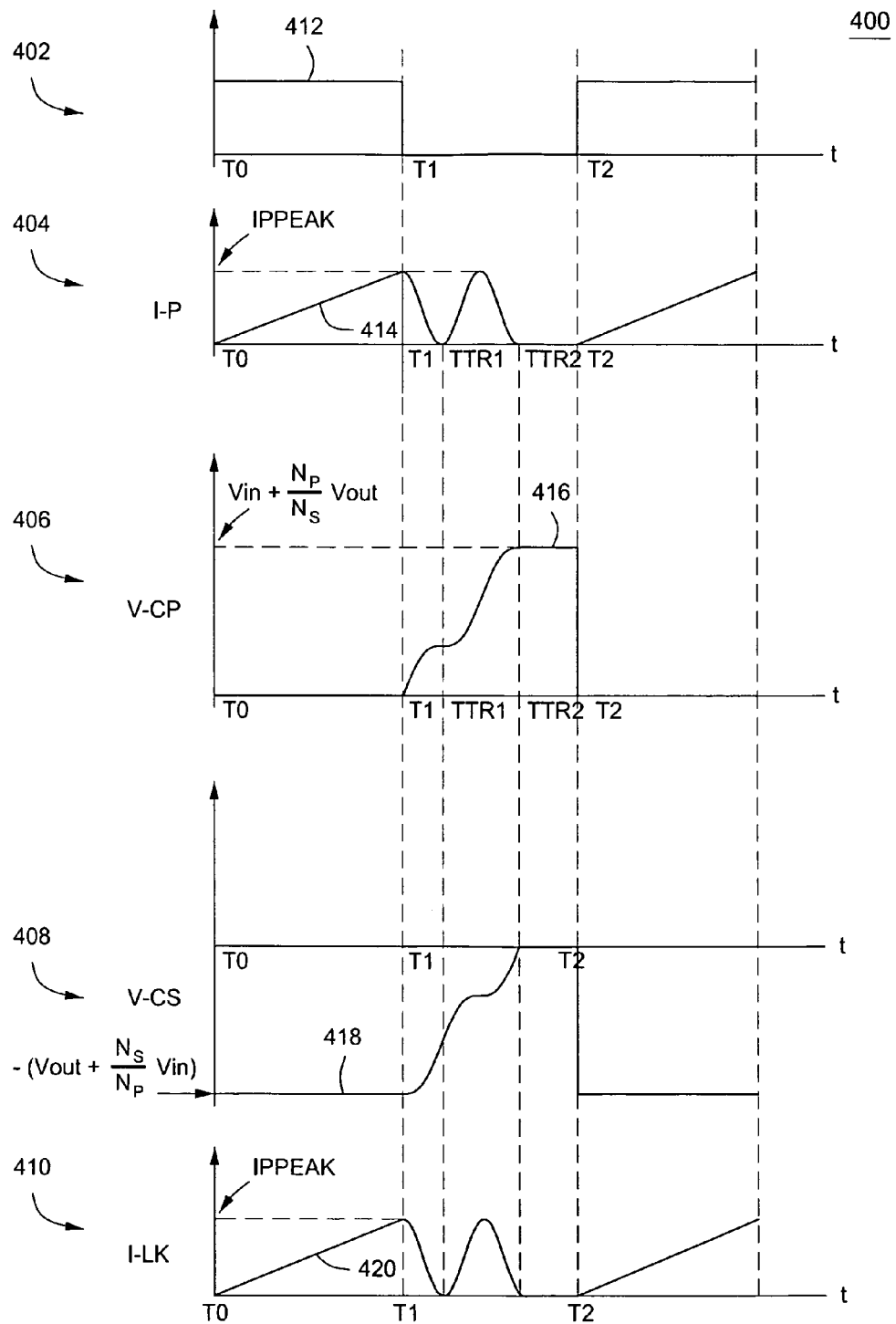
FIG. 4 is a plurality of graphical diagrams depicting current and voltage waveforms of the DC-DC converter when lossless commutation is achieved based on a second transition time in accordance with one or more embodiments of the present invention.

FIG. 4 is a plurality of graphical diagrams 400 depicting current and voltage waveforms of the DC-DC converter 104 when lossless commutation is achieved based on a second transition time in accordance with one or more embodiments of the present invention. The second transition time TTR2 is determined based on equation (2) with a value of n=2. The DC-DC converter 104 may be operated to achieve the lossless commutation based on any of the equations (3), (4), or (5) as previously described, where n=2.

The graphical diagrams 400 comprise diagram 402 of a waveform 412 depicting a switch control voltage over time ("switch control waveform 412"), diagram 404 of a waveform 414 depicting the primary current over time ("Ip waveform 414"), diagram 406 of a waveform 416 depicting voltage across the capacitor CP over time ("Vcp waveform 416"), diagram 408 of a waveform 418 depicting voltage across the capacitor CS over time ("Vcs waveform 418"), and diagram 410 of a waveform 420 depicting leakage inductance current Ilk over time ("Ilk waveform 420"). The leakage inductance current Ilk is equivalent to the primary current Ip but is depicted separately to emphasize that, following the opening of the switch 112, the current flow through the primary winding 108p results from energy stored in the inductor LK.

In some alternative embodiments, the Vcs waveform 418 depicts voltage across an alternative secondary switching element (e.g., a switch controlled by a suitable controller for performing the secondary rectification).

Analogous to the switch control waveform 312, the switch control waveform 412 is generated by the DC-DC conversion control module 120 for activating and deactivating the current control switch 112. When the switch control waveform 412 is high, the current control switch 112 is activated (i.e., on); when the switch control waveform 412 is low, the current control switch 112 is deactivated (i.e., off). From time T0 to time T1, the switch control waveform 412 is high and maintains the current control switch 112 in an active state. The Ip waveform 414 and the Ilk waveform 420 identically linearly rise toward a peak value of Ippeak. The Vcp waveform 416 is essentially zero due to the active current control switch 112, and the diode 114 is reversed biased with the Vcs waveform 418 at $-(Vout+(Ns/Np)*Vin)$.

At time T1, the switch control waveform 412 drops to low and deactivates the current control switch 112. The Ip waveform 414 begins to decline from Ippeak and ring between the values of zero and Ippeak in the form of a cosine function with a DC offset of ½*Ippeak; the Ip waveform 414 reaches a first zero point with zero slope (i.e., valley) at a first transition time $$TTR1 = T1 + \pi\sqrt{\frac{1}{2}Llk*Cmatch}.$$

Due to the presence of the leakage inductance (i.e., the inductance represented by inductor LK), at time T1 the Vcp waveform 416 begins to rapidly rise in the form of a sine wave summed with a linear ramp function. The slope of the ramp function is equal and opposite to the minimum slope of the sine function, resulting in a zero slope at the first transition time TTR1.

At time T1, the Ilk waveform 420, identical to the Ip waveform 414, begins to decline toward zero and ring sinusoidally between the values of zero and Ippeak in the form of a cosine function with a DC offset of ½*Ippeak; the IIk waveform 420 reaches a first zero point with zero slope (i.e., valley) at the first transition time TTR1. As the energy stored in the inductor LK (i.e., energy stored in the primary winding of a real transformer) is transferred to the secondary winding 108s, the Vcs waveform 418 rises in the form of a cosine function summed with a linear ramp function. The slope of the ramp is equal and opposite to the minimum slope of the cosine function, resulting in a flat spot of zero slope that is 90 degrees off from the first transition time TTR1.

The switch control waveform 412 remains low and a second transition time TTR2 occurs at time $$T1 + 3*\pi\sqrt{\frac{1}{2}Llk*Cmatch}.$$

At the second transition time TTR2, the Ip waveform 414 reaches a second zero point with zero slope (i.e., valley) and remains at zero. Additionally, the Vcp waveform 416 reaches a steady state value of Vin+(Np/Ns)*Vout (dVcp/dt=0 at TTR2), the Vcs waveform 418 reaches a steady state value of zero, and the IIk waveform 420 (identical to the Ip waveform 414) reaches a steady state value of zero (dIIk/dt=0 at TTR2).

At time T2, the switch control waveform 412 returns to a high level to activate the current control switch 112. The Ip waveform 414 and the IIk waveform 420 identically begin to linearly rise. The Vcp waveform 416 is essentially zero due to the active current control switch 112, and the diode 114 is reversed biased with the Vcs waveform 418 at −(Vout+(Ns/Np)*Vin).

Figure 5:
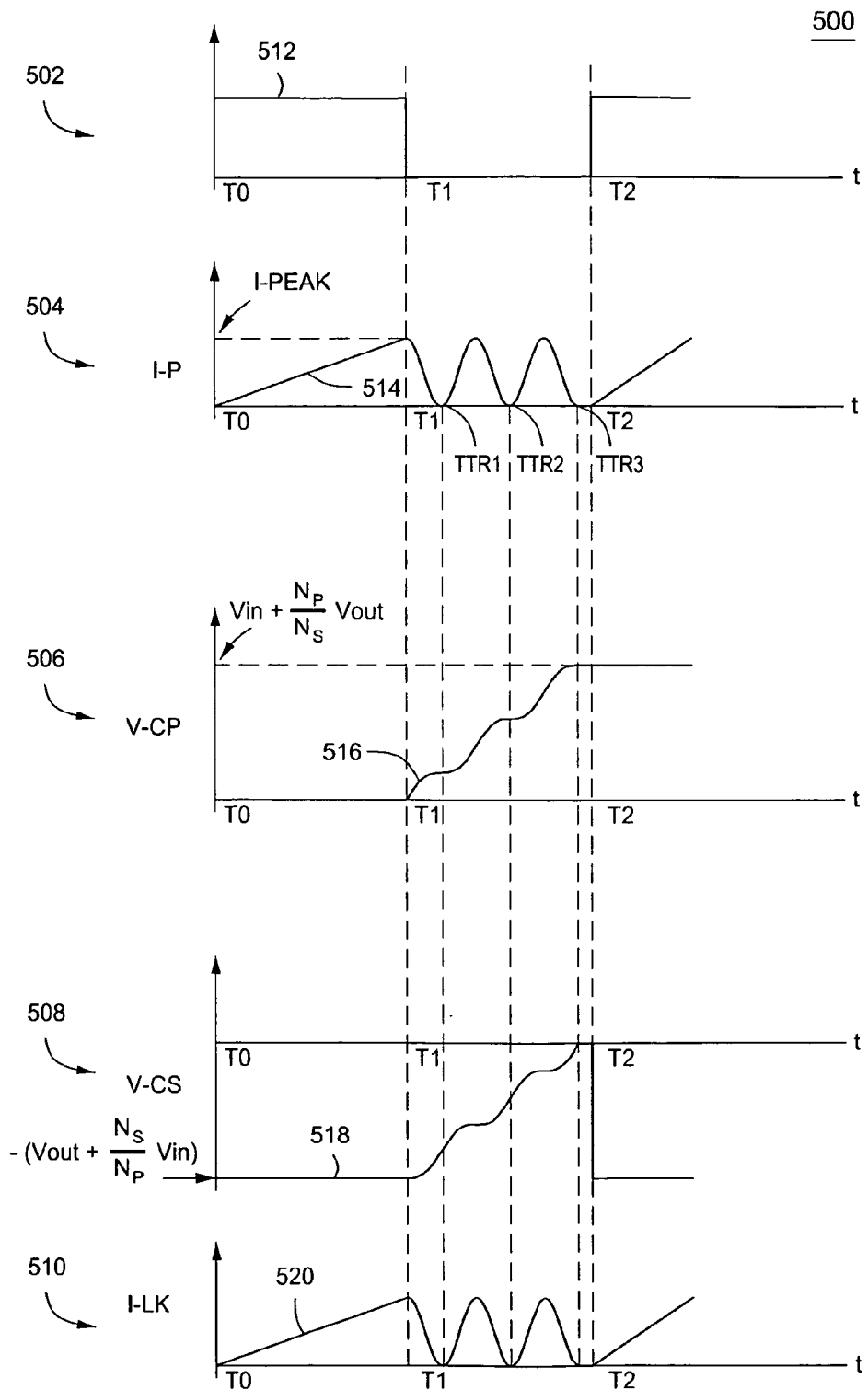
FIG. 5 is a plurality of graphical diagrams depicting current and voltage waveforms of the DC-DC converter when lossless commutation is achieved based on a third transition time in accordance with one or more embodiments of the present invention.

FIG. 5 is a plurality of graphical diagrams 500 depicting current and voltage waveforms of the DC-DC converter 104 when lossless commutation is achieved based on a third transition time in accordance with one or more embodiments of the present invention. The third transition time TTR3 is determined based on equation (2) with a value of n=3. The DC-DC converter 104 may be operated to achieve the lossless commutation based on any of the equations (3), (4), or (5) as previously described, where n=3.

The graphical diagrams 500 comprise diagram 502 of a waveform 512 depicting a switch control voltage over time ("switch control waveform 512"), diagram 504 of a waveform 514 depicting the primary current over time ("Ip waveform 514"), diagram 506 of a waveform 516 depicting voltage across the capacitor CP over time ("Vcp waveform 516"), diagram 508 of a waveform 518 depicting voltage across the capacitor CS over time ("Vcs waveform 518"), and diagram 510 of a waveform 520 depicting leakage inductance current IIk over time ("IIk waveform 520"). The leakage inductance current IIk is equivalent to the primary current Ip but is depicted separately to emphasize that, following the opening of the switch 112, the current flow through the inductor LM (i.e., current flow through the primary winding of a real transformer) results from energy stored in the inductor LK.

In some alternative embodiments, the Vcs waveform 518 depicts voltage across an alternative secondary switching element (e.g., a switch controlled by a suitable controller for performing the secondary rectification).

Analogous to the switch control waveforms 312 and 412, the switch control waveform 512 is generated by the DC-DC conversion control module 120 for activating and deactivating the current control switch 112. When the switch control waveform 512 is high, the current control switch 112 is activated (i.e., on); when the switch control waveform 512 is low, the current control switch 112 is deactivated (i.e., off). From time T0 to time T1, the switch control waveform 512 is high and maintains the current control switch 112 in an active state. The Ip waveform 514 and the IIk waveform 520 identically linearly rise toward a peak value of Ippeak. The Vcp waveform 516 is essentially zero due to the active current control switch 112, and the diode 114 is reversed biased with the Vcs waveform 518 at −(Vout+(Ns/Np)*Vin).

At time T1, the switch control waveform 512 drops to low and deactivates the current control switch 112. The Ip waveform 514 begins to decline from Ippeak and ring between the values of zero and Ippeak in the form of a cosine function with a DC offset of ½*Ippeak; the Ip waveform 514 reaches zero points with zero slope (i.e., valleys) at first and second transition times $$TTR1 = T1 + \pi\sqrt{\frac{1}{2}Llk*Cmatch} \text{ and }$$

$$TTR2 = T1 + 3*\pi\sqrt{\frac{1}{2}Llk*Cmatch}.$$

Due to the presence of the leakage inductance (i.e., the inductance represented by inductor LK), at time T1 the Vcp waveform 516 begins to rapidly rise in the form of a sine wave summed with a linear ramp function. The slope of the ramp function is equal and opposite to the minimum slope of the sine function, resulting in zero slope points at the first and second transition times TTR1 and TTR2.

At time T1, the IIk waveform 520 (identical to the Ip waveform 514) begins to decline toward zero and rings sinusoidally between the values of zero and Ippeak in the form of a cosine function with a DC offset of ½*Ippeak; the IIk waveform 520 reaches zero points with zero slope (i.e., valleys) at the first and second transition times TTR1 and TTR2. As the energy stored in the inductor LK (i.e., energy stored in the primary winding of a real transformer) is transferred to the secondary winding 108s, the Vcs waveform 518 begins to rise in the form of a cosine function summed with a linear ramp function. The slope of the ramp is equal and opposite to the minimum slope of the cosine function, resulting in flat spots of zero slope that are 90 degrees off from each of the first and second transition times TTR1 and TTR2.

The switch control waveform 412 remains low and a third transition time TTR3 occurs at time $$T1 + 5*\pi\sqrt{\frac{1}{2}Llk*Cmatch}.$$

At the third transition time TTR3, the Ip waveform 514 reaches a third zero point with zero slope (i.e., valley) and remains at zero. Additionally, the Vcp waveform 516 reaches a steady state value of Vin+(Np/Ns)*Vout (dVcp/dt=0 at TTR3), the Vcs waveform 518 reaches a steady state value of zero, and the IIk waveform 520 (identical to the Ip waveform 514) reaches a steady state value of zero (dIIk/dt=0 at TTR3).

At time T2, the switch control waveform 512 returns to a high level to activate the current control switch 112. The Ip waveform 514 and the IIk waveform 520 identically begin to linearly rise. The Vcp waveform 516 is essentially zero due to the active current control switch 112, and the diode 114 is reversed biased with the Vcs waveform 518 at −(Vout+(Ns/Np)*Vin).

Figure 6:
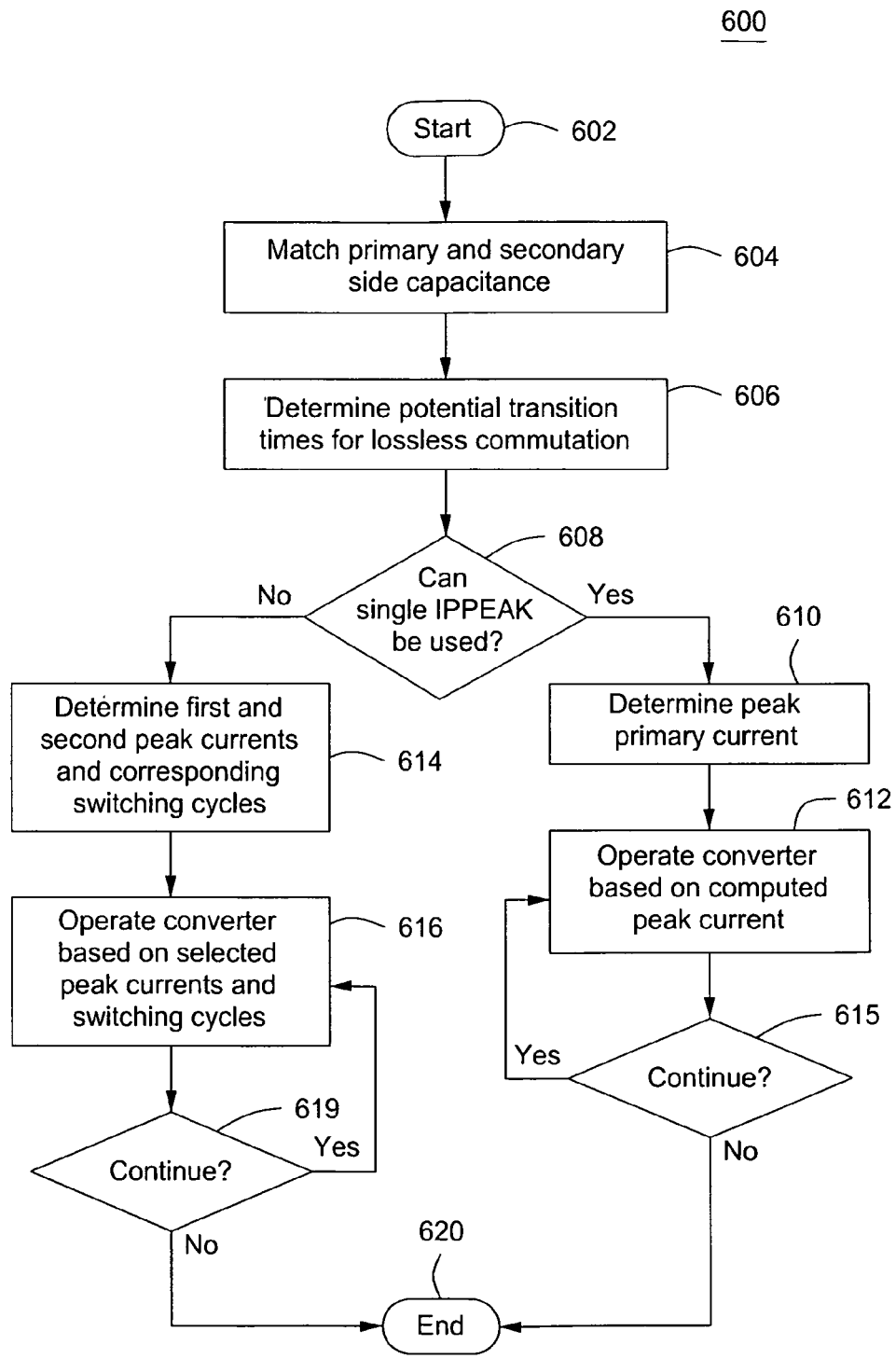
FIG. 6 is a flow diagram of a method for achieving lossless commutation during operation of a DC-DC converter in accordance with one or more embodiments of the present invention.

FIG. 6 is a flow diagram of a method 600 for achieving lossless commutation during operation of a DC-DC converter in accordance with one or more embodiments of the present invention. The DC-DC converter receives a DC input voltage Vin from a DC voltage source and converts the input voltage to a DC output voltage Vout. In some embodiments, such as the embodiment described below, the DC-DC converter is a flyback converter comprising a transformer, where a primary side comprises a primary winding of the transformer and a secondary side comprises a secondary winding of the transformer (e.g., the DC-DC converter 104). The DC-DC converter further comprises a current control switch coupled in series with the primary winding for controlling current flow through the primary winding (e.g., current control switch 112), and a secondary rectification diode (i.e., a secondary switching element) coupled in series with the secondary winding (e.g., diode 114). In some alternative embodiments, different configurations may be employed for secondary rectification. For example, the secondary rectification diode may be coupled in a different configuration to the secondary winding, a second diode may be coupled to the secondary winding, or the secondary rectification may be performed by a switch controlled by a suitable controller rather than a diode (e.g., "synchronous rectification").

The converter transformer has a parasitic inductance (i.e., a leakage inductance) that can be modeled as an inductor in series with the primary winding or, alternatively, in a manner that is electronically equivalent to being coupled in series with the primary winding (e.g., the leakage inductance may be modeled as the inductor LK in series with the secondary winding). A primary capacitor (e.g., CP representing an effective primary side capacitance Ccp) is coupled across the current control switch or coupled to the DC-DC converter in a manner that is electronically equivalent to being coupled across the current control switch (e.g., the capacitor may be coupled across the primary winding); in some embodiments, the primary capacitor may represent a parasitic capacitance of the current control switch. A secondary capacitor (e.g., CS representing an effective secondary side capacitance Ccs) is coupled across the secondary rectification diode or in a manner that is electronically equivalent to being coupled across the secondary rectification diode; in some embodiments, the secondary capacitor may represent a parasitic capacitance of the secondary rectification diode.

The DC-DC converter may be employed in a stand-alone configuration for DC-DC power conversion; alternatively, the DC-DC converter may be utilized with or as a component of other power conversion devices, such as a DC-AC inverter. In one or more alternative embodiments, the DC-DC converter may be a boost converter, a buck-boost converter, a forward converter, a full bridge converter, or similar converter having similar commutations.

The method 600 starts at step 602 and proceeds to step 604. At step 604, the primary side capacitance and the secondary side capacitance are matched based on a turns ratio of the primary and secondary windings of the transformer; i.e., the ratio of the primary side capacitance to the secondary side capacitance is equal to $(Ns/Np)^2$, where Ns is the number of turns of the secondary winding and Np is the number of turns of the primary winding.

In some embodiments, the primary and secondary side capacitances may be matched by selecting suitable components. For example, the primary and secondary side capacitances may be the parasitic capacitances of the current control switch and the secondary rectification diode, respectively, and the current control switch and the secondary rectification diode are selected such that their parasitic capacitances are matched based on the transformer turns ratio. These primary and secondary side capacitances may or may not be linear; for example, parasitic capacitance of a metal-oxide-semiconductor field-effect transistor (MOSFET) or a diode may vary considerably over voltage. In such embodiments where the primary and/or secondary side capacitance is non-linear, the non-linear capacitance(s) have an effective capacitance at a specific operating point and the current control switch and the secondary rectification diode may be selected such that their effective capacitances are suitably matched. For example, values to achieve the results of the present invention may be determined by utilizing numerical analysis, simulation, or similar techniques.

In other embodiments, the primary and secondary side capacitances may be matched by dynamically tuning, adding, and/or removing one or more converter components. In such embodiments, the primary side capacitance is the total capacitance of the switch parasitic capacitance plus any capacitors coupled across the switch as well as any electronically equivalent locations, and the secondary side capacitance is the total capacitance of the secondary rectification diode parasitic capacitance plus any capacitors coupled across the diode as well as any electronically equivalent locations. The primary and secondary side capacitances may be matched by tuning and/or operably switching one or more of capacitors into or out of the circuit (e.g., an added capacitor may be switched into/out of the circuit by activating/deactivating a switch in series with the capacitor). For example, one or more capacitors may be added across the current control switch and/or across the secondary rectification diode to achieve the matched capacitances; alternatively, one or more capacitors may be added to the DC-DC converter 104 in a manner that is electronically equivalent to being coupled across the current control switch and/or the secondary rectification diode.

The method 600 proceeds to step 606. At step 606, potential transition times are determined for achieving lossless commutation when the current control switch is deactivated and energy stored in the primary winding is transferred to the secondary winding. In order to achieve the lossless commutation, a leakage inductance current (i.e., a current Ilk through the primary winding) must reach a valley (i.e., a value of zero with zero slope dIlk/dt=0) at the same time that voltages across the current control switch (Vcp) and across the diode or an alternative secondary switching element (Vcs) reach their steady state values of Vin+(Np/Ns)*Vout and zero, respectively. Such conditions may occur at one of regular intervals following the opening of the current control switch (i.e., at transition times). These transition times occur at intervals of $$n*\pi\sqrt{\frac{1}{2}Llk*Cmatch},$$

where n is an odd integer (e.g., 1, 3, 5, or the like), Llk is the total effective series inductance referenced to the primary side, and Cmatch is the matched primary and secondary side effective capacitance. In some embodiments, one or more inductors may be added in series with the primary winding and/or the secondary winding such that the inductance Llk is adjusted by these inductors. In such embodiments, one or more of the added inductors may be tuned and/or switched into or out of the circuit (e.g., by operating a switch in parallel with the inductor) to adjust the inductance Llk by a desired amount.

The method 600 proceeds to step 608 where it is determined whether the DC-DC converter can be operated using a single peak current value Ippeak while achieving lossless commutation. In order to achieve lossless commutation, the value of Ippeak value must satisfy equation (3) as well as result in the desired Vout for a given Vin. If such a condition can be met, the method 600 proceeds to step 610. At step 610, a peak current Ippeak for operating the DC-DC converter is determined that both satisfies equation (3) and generates the desired Vout for the input voltage Vin. The method proceeds to step 612 where the DC-DC converter is operated utilizing the computed peak current level for switching.

The method 600 proceeds to step 615. At step 615, a determination is made whether to continue operating the DC-DC converter. If the result of the determination at step 615 is yes, the method 600 returns to step 612; if the result of the determination at step 615 is no, the method 600 proceeds to step 620 where it ends.

If, at step 608, it is determined that a single Ippeak cannot be utilized, the method 600 proceeds to step 614. At step 614, a solution for achieving lossless commutation by operating the DC-DC conversion module at two different peak current values that each satisfy equation (3) and thereby result in lossless commutation is determined. Based on the possible transition times to achieve lossless commutation, a first peak current and a corresponding first number of switching cycles are determined along with a second peak current and a corresponding second number of switching cycles (i.e., the DC-DC converter is operated to switch at the first peak current over the first number of switching cycles and then to switch at the second peak current over the second number of switching cycles). The first and second peak currents and the corresponding switching cycles are determined such that dithering between the peak currents results in an average peak current that generates the desired output voltage Vout for an input voltage Vin. For example, the DC-DC converter may operate for 42 microseconds utilizing a first peak current that achieves lossless commutation, then operate for 126 microseconds utilizing a second peak current that achieves lossless commutation, then back to 42 microseconds utilizing the first peak current, and so on. Such dithering between the first and the second peak current values may be performed using a Direct Digital Synthesizer (DDS) function, sigma-delta modulation, or any suitable type of modulation for controlling the average current. In some alternative embodiments, three or more peak currents for lossless commutation and corresponding numbers of switching cycles for operating at each of the peak currents may be utilized to achieve the desired average peak current.

The method 600 proceeds to step 616, where the DC-DC converter is operated based on the first and second peak current values and the corresponding first and second number of switching cycles to achieve lossless commutation during the DC-DC power conversion. At step 619, a determination is made whether to continue operating the DC-DC converter. If the result of the determination at step 619 is yes, the method 600 returns to step 616; if the result of the determination at step 619 is no, the method 600 then proceeds to step 620 where it ends.

In some alternative embodiments, one or more of the DC-DC converter operating parameters Vin, Vout, Cmatch, or Llk may change during operation of the DC-DC converter. In such embodiments, the method 600 returns to step 606 and one or more of the DC-DC converter operating parameters may be dynamically adjusted such that the DC-DC converter continues to operate with lossless commutation.

Figure 7:
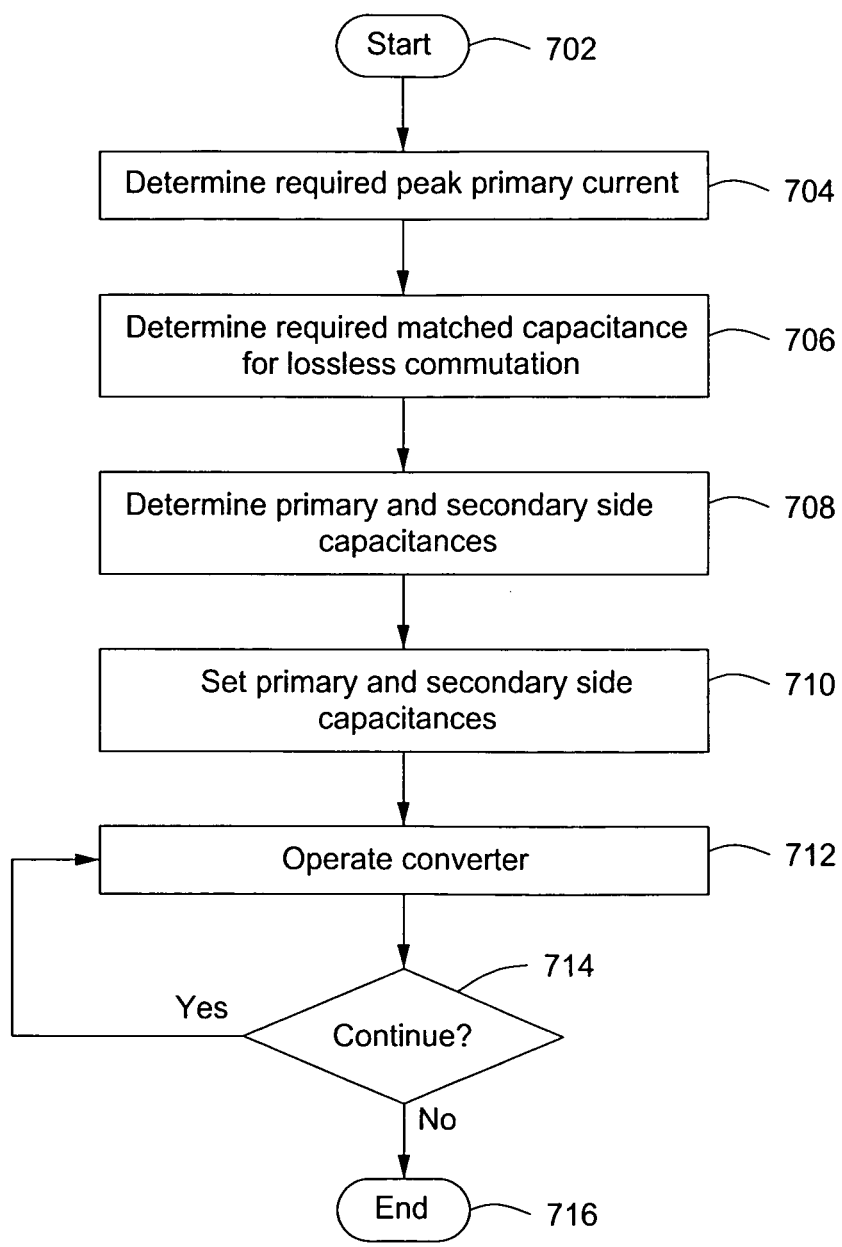
FIG. 7 is a flow diagram of a method for setting primary and secondary capacitances to achieve lossless commutation during operation of a DC-DC converter in accordance with one or more embodiments of the present invention.

FIG. 7 is a flow diagram of a method 700 for setting primary and secondary capacitances to achieve lossless commutation during operation of a DC-DC converter in accordance with one or more embodiments of the present invention. The DC-DC converter of the method 700 is analogous to the DC-DC converter described above with respect to the method 600.

The method 700 starts at step 702 and proceeds to step 704, where a peak current is determined for operating the DC-DC converter to convert the input voltage to a desired output voltage. At step 706, a required matched effective capacitance for primary and secondary side capacitances (i.e., Cmatch) is determined to achieve lossless commutation.

The matched effective capacitance must be determined such that, after the current control switch is deactivated, a leakage inductance current (i.e., a current Ilk through the primary winding) reaches a valley coincident with the voltages Vcp across the current control switch and Vcs across the secondary rectification diode (or an alternative secondary switching element) reaching their respective steady state values of Vin+(Np/Ns)*Vout and zero. Such conditions occur for multiple values of Cmatch as defined by equation (4) above (i.e., as the odd integer n changes, a different suitable value of Cmatch results). A suitable value of Cmatch as defined by equation (4) is selected based on the total effective series inductance referenced to the primary side (e.g., a measured leakage inductance of a transformer to be used in the DC-DC converter) and the determined peak current. In some embodiments, a suitable value of Cmatch may be selected based on component selection for the DC-DC converter (e.g., current control switch selection, diode selection, selection of additional capacitors, or the like).

The method 700 proceeds to step 708. At step 708, the primary side capacitance Ccp and the secondary side capacitance Ccs are determined, based on the selected value of Cmatch, such that equation (1) above is satisfied. In some embodiments, the primary side capacitance Ccp is the parasitic capacitance of the current control switch and the secondary side capacitance Ccs is the parasitic capacitance of the secondary rectification diode. In other embodiments, the primary side capacitance is the total capacitance of the current control switch parasitic capacitance plus any capacitors coupled across the current control switch as well as any electronically equivalent locations, and/or the secondary side capacitance is the total capacitance of the secondary rectification diode parasitic capacitance plus any capacitors coupled across the diode as well as any electronically equivalent locations.

The method 700 proceeds to step 710, where the primary and secondary side capacitances are set to the required values. In some embodiments, the primary and secondary side capacitances may be set to the required values by design choice of the current control switch and the secondary rectification diode; i.e., the current control switch and the secondary rectification diode may be selected such that their parasitic capacitances are equal to the required primary and secondary side capacitances, respectively. In some such embodiments, these parasitic capacitances may not be linear; however, the non-linear capacitances have an effective capacitance at a specific operating point and the current control switch and/or the secondary rectification diode may be selected to achieve the required primary and secondary side capacitances at one or more such operating points. For example, values to achieve the results of the present invention may be determined by utilizing numerical analysis, simulation, or similar techniques In other embodiments, the primary and/or secondary side capacitances may be dynamically set by tuning, adding, and/or removing one or more converter capacitors. In such embodiments, the primary side capacitance is the total capacitance of the current control switch parasitic capacitance plus any capacitors coupled across the switch as well as any electronically equivalent locations, and the secondary side capacitance is the total capacitance of the secondary rectification diode parasitic capacitance plus any capacitors coupled across the diode as well as any electronically equivalent locations. These capacitors may be tuned and/or switched into/out of the circuit (e.g., by activating/deactivating a switch in series with a capacitor) such that the required primary and secondary sides capacitances are achieved.

The method 700 proceeds to step 712, where the DC-DC converter is operated based on the required peak current and the matched capacitances, thereby achieving lossless commutation during the DC-DC power conversion.

At step 714, a determination is made whether to continue operating the DC-DC converter. If the result of such determination is yes, the method 700 returns to step 712; if the result of such determination is no, the method 700 proceeds to step 716 where it ends.

In some alternative embodiments, lossless commutation may be achieved by utilizing a dithering technique to operate a DC-DC converter at different peak currents (e.g., as described above with respect to the method 600) in addition to setting primary and secondary side capacitances as described in the method 700.

In other alternative embodiments, one or more of the DC-DC converter operating parameters Vin, Vout, peak current Ippeak, or total effective series inductance referenced to the primary side, may change during operation of the DC-DC converter. In such embodiments, the method 700 returns to step 704 and one or more of the DC-DC converter operating parameters may be dynamically adjusted such that the DC-DC converter continues to operate with lossless commutation.

Figure 8:
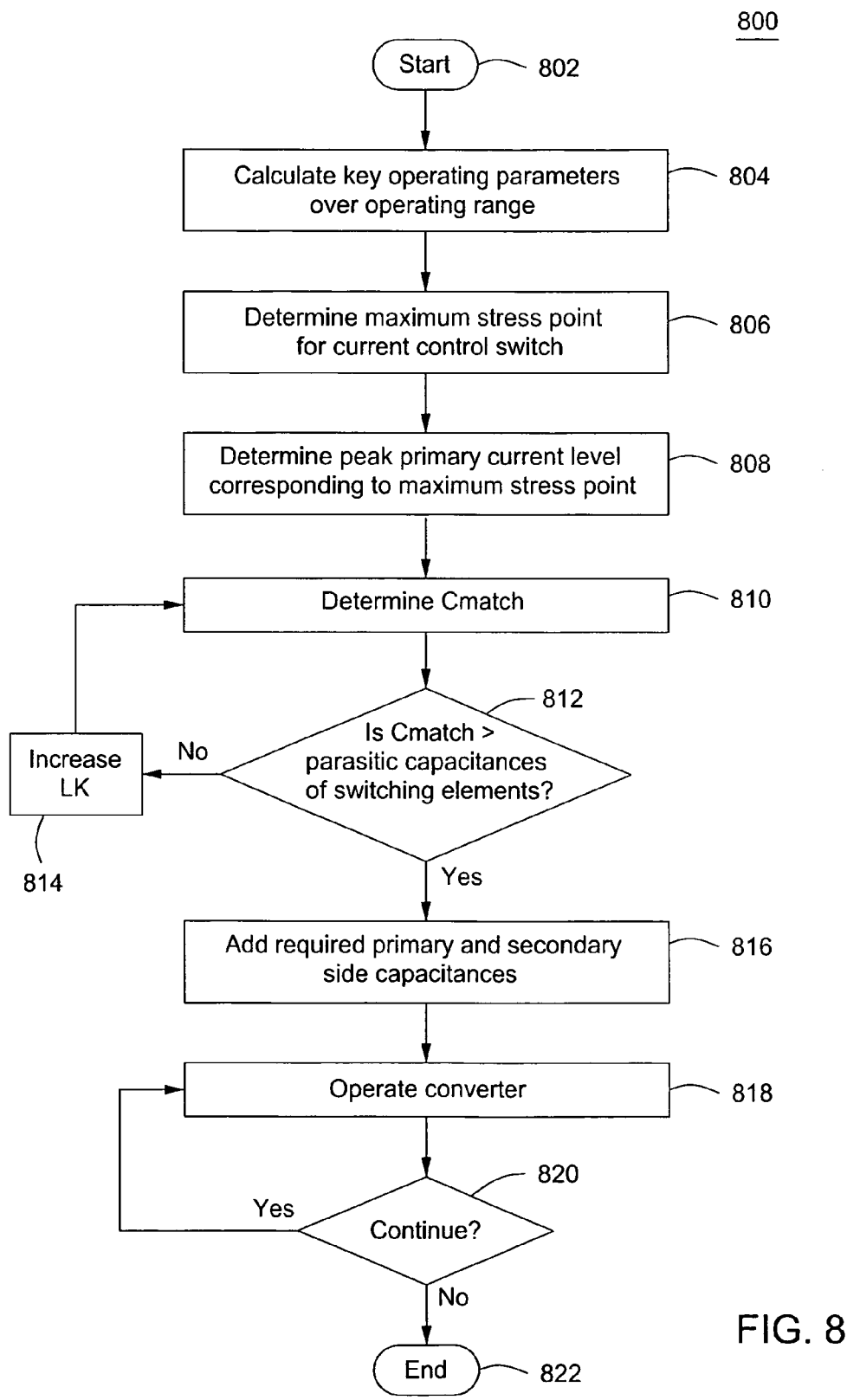
FIG. 8 is a flow diagram of a method for reducing peak stress on a current control switch during operation of a DC-DC converter in accordance with one or more embodiments of the present invention.

FIG. 8 is a flow diagram of a method 800 for reducing peak stress on a current control switch during operation of a DC-DC converter in accordance with one or more embodiments of the present invention. The DC-DC converter of the method 800 is analogous to the DC-DC converter described above with respect to the method 600.

The DC-DC converter may be operated over a range of peak current values (i.e., values at which the current control switch is deactivated) to achieve a desired output voltage at a given time based on the input voltage at such time. For example, in order to maintain a desired output voltage, the peak current value for switching the current control switch may be adjusted as the input voltage changes.

The method 800 begins at step 802 and proceeds to step 804. At step 804, key operating parameters are computed for the DC-DC converter over an operating range. Such key operating parameters may include input voltage (Vin), output voltage (Vout), voltage across the current control switch (Vcp), voltage across the secondary rectification diode or an alternative secondary switching element (Vcs), and/or primary current (Ip)/leakage inductance current (Ilk). Additionally or alternatively, other operating parameters of the DC-DC converter may be computed. In some embodiments, an operating map may be generated for mapping the measured key parameters over the operating range.

The method 800 proceeds to step 806, where a point of maximum stress on the current control switch is determined. In some embodiments, the maximum stress point may be identified as occurring when the voltage Vcp across the current control switch is at its highest level. At step 808, a peak primary current corresponding to the point of maximum switch stress is determined ("maximum stress peak current"). In some embodiments, the highest peak primary current corresponds to the maximum stress point. The method 800 then proceeds to step 810.

At step 810, a required matched primary and secondary side effective capacitance value (i.e., Cmatch) is determined such that lossless commutation can be achieved when switching at the maximum stress peak current. The value of Cmatch is determined based on the maximum stress peak current and the total effective series inductance referenced to the primary side such that equation (4) is satisfied. When resulting from only the transformer leakage inductance, the total effective series inductance referenced to the primary side may be determined, for example, by measuring the leakage inductance of a particular transformer to be used in the DC-DC converter.

The method 800 proceeds to step 812, where a determination is made whether the value of Cmatch is greater than the parasitic capacitances of the switching elements (e.g., the parasitic capacitances of the current control switch 112 and the rectification diode 114). If the result of such determination is no, the method 800 proceeds to step 814, where a total effective series inductance referenced to the primary side of the converter (e.g., LK) is increased, for example by one or more of component design choice or tuning and/or switching one or more inductors into/out of the DC-DC converter. The method 800 then returns to step 810.

If the result of the determination at step 812 is yes, the method 800 proceeds to step 816. At step 816, the required effective primary and secondary side capacitances are established such that equation (1) is satisfied, where the primary side capacitance is the total capacitance of the current control switch parasitic capacitance plus any capacitors coupled across the current control switch as well as any electronically equivalent locations, and the secondary side capacitance is the total capacitance of the secondary rectification diode parasitic capacitance plus any capacitors coupled across the diode as well as any electronically equivalent locations. In some embodiments, the effective primary and/or secondary side capacitances may be increased by design choice of the current control switch and/or the secondary rectification diode, respectively. Additionally or alternatively, one or more capacitors may be tuned, added to the DC-DC converter, and/or removed from the DC-DC converter as previously described.

The method 800 proceeds to step 818 where the DC-DC converter is operated. As a result of the matched primary and secondary side capacitances, lossless commutation occurs when the DC-DC converter switches at the maximum stress peak current, thereby eliminating ringing that would otherwise occur during switching at the maximum stress peak current. The stress level on the current control switch is thus capped at a lower value than that which would occur when switching without achieving lossless commutation.

The method 800 proceeds to step 820, where a determination is made whether to continue operating the DC-DC converter. If the result of such determination is yes, the method 800 returns to step 818; if the result of such determination is no, the method 800 proceeds to step 822 where it ends.

Figure 9:
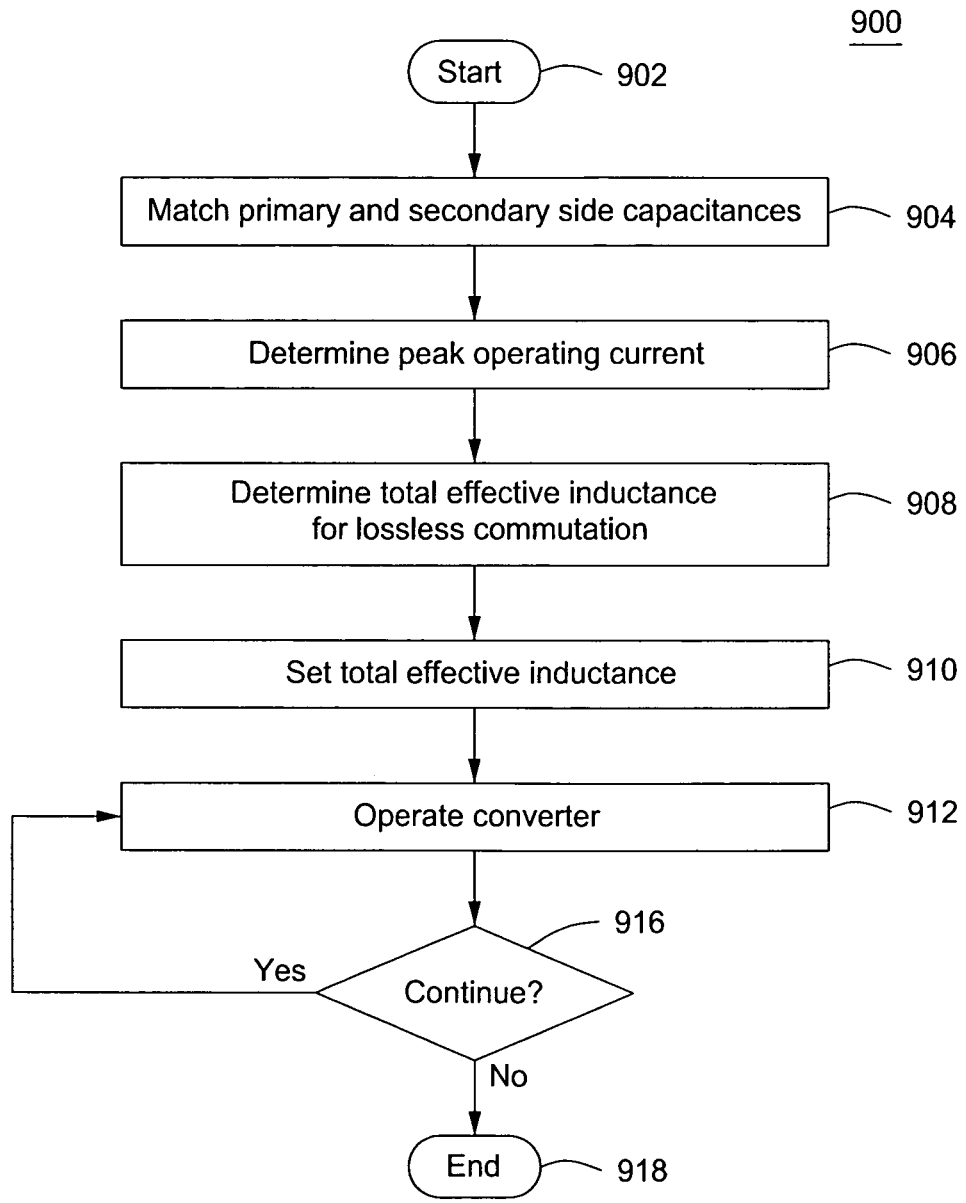
FIG. 9 is a flow diagram of a method for setting an inductance to achieve lossless commutation during operation of a DC-DC converter in accordance with one or more embodiments of the present invention.

FIG. 9 is a flow diagram of a method 900 for setting an inductance to achieve lossless commutation during operation of a DC-DC converter in accordance with one or more embodiments of the present invention. The DC-DC converter of the method 900 is analogous to the DC-DC converter described above with respect to the method 600.

The method 900 starts at step 902 and proceeds to step 904, where the primary side capacitance and the secondary side capacitance are matched based on the turns ratio of the primary and secondary windings, as previously described with respect to the method 600. At step 906, a peak current is determined for operating the DC-DC converter to convert the input voltage to a desired output voltage. The method 900 proceeds to step 908, where a value for a total effective series inductance which will achieve lossless commutation is determined based on equation (5). In some embodiments, the total effective series inductance comprises the leakage inductance of the transformer. In other embodiments, the total effective series inductance comprises inductances intentionally and/or unintentionally placed on the primary and/or secondary side. For example, the total effective series inductance may comprise the parasitic inductance of the transformer plus the parasitic inductance(s) of one or more other components, and/or the inductance(s) of one or more inductors coupled to the DC-DC converter in a manner that is electronically equivalent to being coupled in series with the primary winding.

The method 900 proceeds to step 910, where the total effective series inductance is set in the DC-DC converter. In some embodiments, the total effective series inductance may be set by design choice of one or more components of the DC-DC converter; e.g., the transformer may be selected such that its parasitic inductance is equal to the total effective series inductance. In other embodiments, the total effective series inductance may be dynamically set by tuning and/or switching one or more inductors into/out of the DC-DC converter.

The method 900 proceeds to step 912, where the DC-DC converter is operated employing the matched primary and secondary side capacitances, the determined peak operating current, and the total effective series inductance. At step 916, a determination is made whether to continue operating the DC-DC converter. If the result of the determination at step 916 is yes, the method 900 returns to step 912. If the result of the determination at step 916 is no, the method 900 proceeds to step 918 where it ends.

In some alternative embodiments, one or more of the DC-DC converter operating parameters input voltage, desired output voltage, or peak current may change during operation of the DC-DC converter. In such embodiments, the method 900 returns to step 908 and one or more of the DC-DC converter operating parameters may be dynamically adjusted such that the DC-DC converter continues to operate with lossless commutation.

Figure 10:
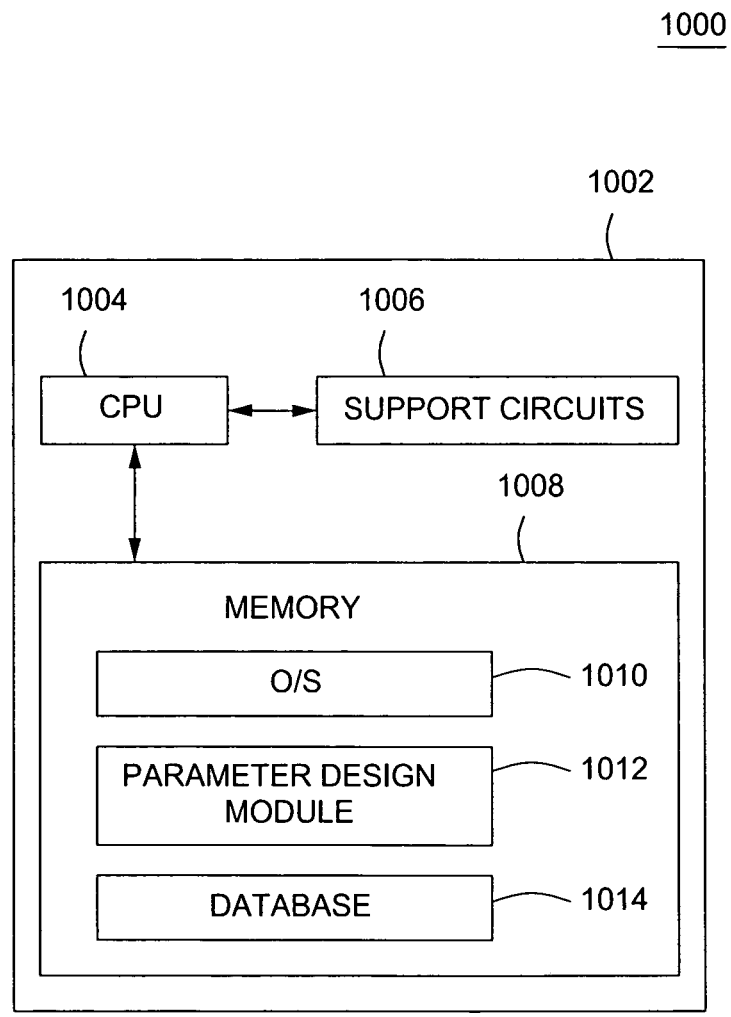
FIG. 10 is a block diagram of a computer for determining one or more DC-DC converter operating parameters in accordance with one or more embodiments of the present invention.

FIG. 10 is a block diagram of a computer 1002 for determining one or more DC-DC converter operating parameters in accordance with one or more embodiments of the present invention. The computer 1002 comprises support circuits 1006 and a memory 1008, each coupled to a central processing unit (CPU) 1004.

The CPU 1004 may comprise one or more conventionally available microprocessors or microcontrollers. Alternatively, the CPU 1004 may include one or more application specific integrated circuits (ASICs). The support circuits 1006 are well known circuits used to promote functionality of the CPU 1004. Such circuits include, but are not limited to, a cache, power supplies, clock circuits, buses, network cards, input/output (I/O) circuits, and the like. The computer 1002 may be implemented using a general purpose computer that, when executing particular software, becomes a specific purpose computer for performing various embodiments of the present invention. In some embodiments, the computer 1002 may be a stand-alone computer, such as a laptop or desktop computer. In other embodiments, the computer 1002 may be part of a DC-DC conversion system; e.g., the computer 1002 may be a component of the DC-DC conversion control module 120.

The memory 1008, or computer readable medium, may comprise random access memory, read only memory, removable disk memory, flash memory, and/or various combinations of these types of memory. The memory 1008 is sometimes referred to as main memory and may, in part, be used as cache memory or buffer memory. The memory 1008 generally stores an operating system (OS) 1010 of the computer 1002. The operating system 1010 may be one of a number of commercially available operating systems such as, but not limited to, SOLARIS from SUN Microsystems, Inc., AIX from IBM Inc., HP-UX from Hewlett Packard Corporation, LINUX from Red Hat Software, Windows 2000 from Microsoft Corporation, and the like.

The memory 1008 may store various forms of application software, such as a parameter design module 1012 for determining one or more operating parameter values for a DC-DC converter (e.g., the DC-DC converter 104) to operate with lossless commutation as previously described. The parameter design module 1012 may be executed to perform one or more of the steps of any of the previously described methods 600-900 for determining one or more DC-DC converter operating parameter values. For example, the parameter design module 1012 may be executed to perform steps 804-816 of the method 800, following which a DC-DC converter is built and operated based upon the determined operating parameters.

The memory 1008 may further comprise various databases, such as a database 1014 for storing data pertaining to the present invention, The foregoing description of embodiments of the invention comprises a number of elements, devices, circuits and/or assemblies that perform various functions as described. These elements, devices, circuits, and/or assemblies are exemplary implementations of means for performing their respectively described functions.

While the foregoing is directed to embodiments of the present invention, other and further embodiments of the invention may be devised without departing from the basic scope thereof, and the scope thereof is determined by the claims that follow.

The invention claimed is:

1. A method for operating a DC-DC converter, comprising:
matching, based on a turns ratio of a transformer of the DC-DC converter, a primary side capacitance of the DC-DC converter and a secondary side capacitance of the DC-DC converter to result in a matched capacitance;
generating at least one operating parameter based on the matched capacitance; and
operating the DC-DC converter with the at least one operating parameter set to cause a primary current to oscillate between a peak value and zero such that a valley of the primary current coincides with a zero crossing of a secondary switching element voltage.

2. The method of claim 1, wherein a secondary switching element having the secondary switching element voltage is a diode coupled to a secondary winding of the transformer.

3. The method of claim 1, wherein the primary side capacitance comprises a first parasitic capacitance of a current control switch and the secondary side capacitance comprises a second parasitic capacitance of a secondary switching element having the secondary switching element voltage.

4. The method of claim 3, wherein (i) the primary side capacitance comprises the first parasitic capacitance and a first effective capacitance of a first at least one capacitor coupled to the DC-DC converter in a manner electronically equivalent to being coupled across the current control switch, and (ii) the secondary side capacitance comprises the second parasitic capacitance and a second effective capacitance of a second at least one capacitor coupled to the DC-DC converter in a manner electronically equivalent to being coupled across the secondary switching element.

5. The method of claim 3, wherein matching the primary and the secondary side capacitances comprises determining the current control switch and the secondary switching element such that their parasitic capacitances are matched based on the turns ratio.

6. The method of claim 1, wherein matching the primary and the secondary side capacitances comprises dynamically adjusting a capacitance of the DC-DC converter.

7. The method of claim 6, wherein dynamically adjusting the capacitance comprises at least one of (i) tuning one or more of at least one capacitor, (ii) switching one or more of the at least one capacitor into the DC-DC converter, or (iii) switching one or more of the at least one capacitor out of the DC-DC converter.

8. The method of claim 1, further comprising determining at least one peak current value, wherein the at least one operating parameter is the at least one peak current value.

9. The method of claim 8, wherein the at least one peak current value is computed based on a formula $$Ippeak = \frac{2*Cmatch*\left(Vin+\frac{Np}{Ns}Vout\right)}{n\pi\sqrt{\frac{1}{2}Llk*Cmatch}},$$

where (i) Ippeak is a peak current value, (ii) n is an odd integer, (iii) Cmatch is a value of the matched capacitance, (iv) Llk is a total inductance referenced to a primary side of the DC-DC converter, (v) Np is a first number of turns of a primary winding of the transformer, (vi) Ns is a second number of turns of a secondary winding of the transformer, (vii) Vin is an input voltage to the DC-DC converter, and (viii) Vout is an output voltage of the DC-DC converter.

10. The method of claim 8, wherein determining the at least one peak current value comprises determining a first peak current value and a second peak current value, and wherein operating the DC-DC converter comprises switching a current control switch at the first peak current value for a first number of cycles and switching the current control switch at the second peak current value for a second number of cycles.

11. The method of claim 1, further comprising determining a value of the matched capacitance based on a peak current, an effective inductance, an input voltage, and an output voltage, wherein the primary side capacitance and the secondary side capacitance are matched based on the value.

12. The method of claim 11, wherein the value of the matched capacitance is computed based on a formula $$Cmatch = \left(\frac{\frac{1}{2}Ippeak*n*\pi\sqrt{\frac{1}{2}Llk}}{Vin+\frac{Np}{Ns}Vout}\right)^2,$$

where (i) Cmatch is the value of the matched capacitance, (ii) n is an odd integer, (iii) Ippeak is a peak current value, (iv) Llk is a total inductance referenced to a primary side of the DC-DC converter, (v) Np is a first number of turns of a primary winding of the transformer, (vi) Ns is a second number of turns of a secondary winding of the transformer, (vii) Vin is an input voltage to the DC-DC converter, and (viii) Vout is an output voltage of the DC-DC converter.

13. The method of claim 1, further comprising setting an inductance of the DC-DC converter based on the matched capacitance.

14. The method of claim 13, wherein the inductance is a total effective series inductance referenced to a primary side of the DC-DC converter.

15. The method of claim 14, further comprising computing a value of the inductance based on a formula $$Llk = \left(\frac{2\sqrt{2*Cmatch}*\left(Vin+\frac{Np}{Ns}Vout\right)}{n\pi*Ippeak}\right)^2,$$

where (i) Llk is the value of the inductance, (ii) n is an odd integer, (iii) Ippeak is a peak current value, (iv) Cmatch is a value of the matched capacitance, (v) Np is a first number of turns of a primary winding of the transformer, (vi) Ns is a second number of turns of a secondary winding of the transformer, (vii) Vin is an input voltage to the DC-DC converter, and (viii) Vout is an output voltage of the DC-DC converter.

16. The method of claim 13, wherein setting the inductance comprises dynamically adjusting at least one inductor of the DC-DC converter.

17. The method of claim 16, wherein dynamically adjusting the at least one inductor comprises at least one of (i) tuning one or more of at least one inductor, (ii) switching one or more of the at least one inductor into the DC-DC converter, or (iii) switching one or more of the at least one inductor out of the DC-DC converter.

18. The method of claim 1, further comprising:
computing at least one voltage and at least one current of the DC-DC converter for operating the DC-DC converter over an operating range;
determining, based on the computed at least one voltage and the computed at least one current, a peak current corresponding to a point of maximum stress on a switch of the DC-DC converter; and
determining, based on the peak current, a value of the matched capacitance, wherein the primary and the secondary side capacitances are matched based on the value of the matched capacitance.

19. The method of claim 18, further comprising mapping the measured at least one voltage and at least one current over the operating range to generate an operating map.

20. The method of claim 18, wherein the peak current corresponds to a maximum peak current occurring over the operating range.

* * * * *